United States Patent
Khoryaev et al.

(10) Patent No.: US 10,708,908 B2
(45) Date of Patent: Jul. 7, 2020

(54) SYSTEMS, METHODS AND DEVICES FOR RESOURCE ALLOCATION ADJUSTMENTS FOR WIRELESS TRANSMISSIONS

(71) Applicant: INTEL CORPORATION, Santa Clara, CA (US)

(72) Inventors: Alexey Khoryaev, Nizhny Novgorod (RU); Sergey Panteleev, Nizhny Novgorod (RU); Sergey D. Sosnin, Zavolzhie (RU); Mikhail Shilov, Nizhny Novgorod (RU); Andrey Chervyakov, Nizhny Novgorod (RU)

(*) Notice: Subject to any disclaimer, the term of this patent is extended or adjusted under 35 U.S.C. 154(b) by 58 days.

(21) Appl. No.: 15/742,406

(22) PCT Filed: Mar. 24, 2016

(86) PCT No.: PCT/US2016/024005
§ 371 (c)(1),
(2) Date: Jan. 5, 2018

(87) PCT Pub. No.: WO2017/052686
PCT Pub. Date: Mar. 30, 2017

(65) Prior Publication Data
US 2018/0376474 A1    Dec. 27, 2018

Related U.S. Application Data

(60) Provisional application No. 62/232,366, filed on Sep. 24, 2015.

(51) Int. Cl.
*H04J 3/16* (2006.01)
*H04W 72/04* (2009.01)
(Continued)

(52) U.S. Cl.
CPC ....... *H04W 72/0446* (2013.01); *H04L 1/0007* (2013.01); *H04L 5/003* (2013.01);
(Continued)

(58) Field of Classification Search
USPC ....... 370/229, 230, 236, 252, 328, 329, 330, 370/458, 463, 468
See application file for complete search history.

(56) References Cited

U.S. PATENT DOCUMENTS

2013/0163555 A1* 6/2013 Turtinen ............... H04W 76/14
370/330
2014/0071954 A1 3/2014 Au et al.
(Continued)

OTHER PUBLICATIONS

Huawei, et al., "Views on LTE Rel-14", RP-151356, 3GPP TSG RAN Meeting #69, Phoenix, AZ, USA, Agenda Item 14.1, Sep. 8, 2015, 24 pages.
(Continued)

*Primary Examiner* — Nguyen H Ngo
(74) *Attorney, Agent, or Firm* — Stoel Rives LLP

(57) ABSTRACT

Increasing a number of orthogonal time-domain transmission opportunities in a Proximity Services (ProSe) traffic generation period can reduce over-air congestion and collision in long term evolution (LTE) communications. Resource configurations can be adjusted, including providing a new physical layer numerology, reducing transmission time (TTI) interval duration, providing a smaller sidelink control information period, configuring logical sidelink control periods and/or multiplexing of control and data transmissions.

8 Claims, 11 Drawing Sheets

(51) Int. Cl.

| | | |
|---|---|---|
| *H04W 76/14* | (2018.01) | |
| *H04L 1/00* | (2006.01) | |
| *H04L 5/00* | (2006.01) | |
| *H04L 27/26* | (2006.01) | |
| *H04W 4/46* | (2018.01) | |
| *H04W 72/12* | (2009.01) | |

(52) U.S. Cl.
CPC ......... *H04L 27/2602* (2013.01); *H04W 76/14* (2018.02); *H04L 5/0064* (2013.01); *H04L 5/0087* (2013.01); *H04W 4/46* (2018.02); *H04W 72/1215* (2013.01)

(56) References Cited

U.S. PATENT DOCUMENTS

| | | | | |
|---|---|---|---|---|
| 2014/0161095 | A1* | 6/2014 | Nan ...................... | H04W 72/04 |
| | | | | 370/330 |
| 2016/0295624 | A1* | 10/2016 | Novlan ................ | H04W 76/14 |
| 2017/0079084 | A1* | 3/2017 | Matsumoto ........... | H04W 76/14 |
| 2017/0135075 | A1* | 5/2017 | Jiang .................. | H04W 72/042 |
| 2017/0164381 | A1* | 6/2017 | Kim ...................... | H04W 76/14 |
| 2018/0288792 | A1* | 10/2018 | Blasco Serrano .......................... | |
| | | | | H04W 72/1242 |

OTHER PUBLICATIONS

PCT/US2016/024005, International Search Report and Written Opinion, dated Jun. 16, 2016, 15 pages.
Samsung, "Overview of V2X features and specification impact", R1-154190, 3GPP TSG RAN WG1, Meeting #82, Beijing, China, Agenda Item 7.2.8.2, Aug. 24-28, 2015, 3 pages.

\* cited by examiner

SYSTEMS, METHODS AND DEVICES FOR RESOURCE ALLOCATION ADJUSTMENTS FOR WIRELESS TRANSMISSIONS

RELATED APPLICATION

This application is a national stage filing under 35 U.S.C. § 371 of International Patent Application No. PCT/US2016/024005, filed Mar. 24, 2016, which claims the benefit under 35 U.S.C. § 119(e) of U.S. Provisional Application No. 62/232,366 filed Sep. 24, 2015, each of which is incorporated by reference herein its entirety.

TECHNICAL FIELD

The present disclosure relates to peer device communications and more specifically to long term evolution (LTE) sidelink resource configuration, for example vehicle-to-vehicle communication.

DETAILED DESCRIPTION

Figure 1:
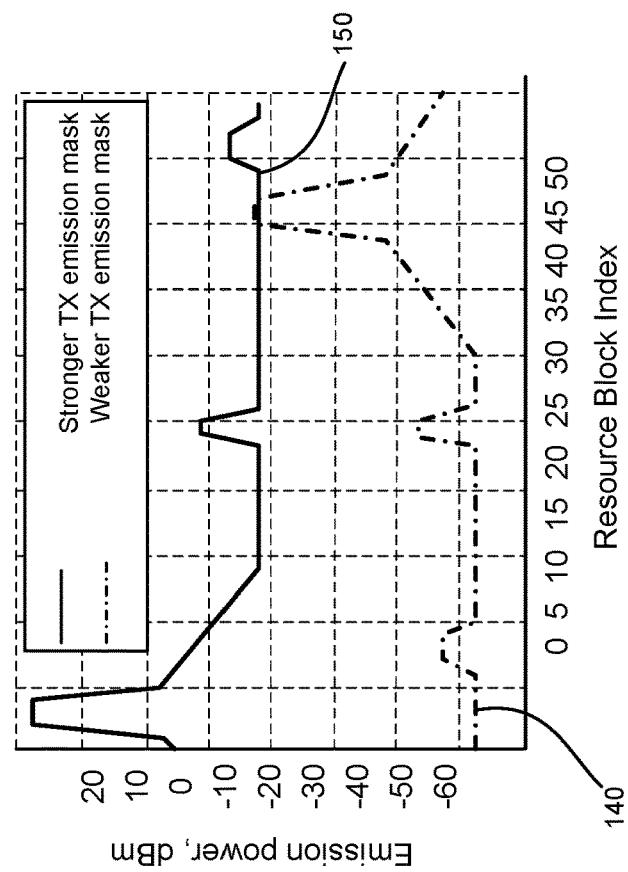
FIG. 1 is a diagram illustrating a communication system consistent with embodiments disclosed herein.
Figure 1:
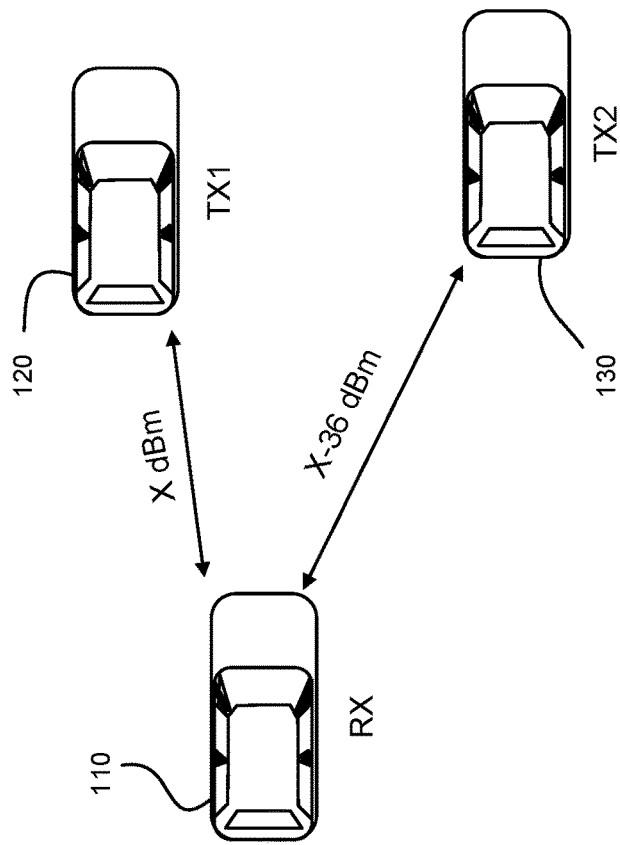

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable increasing the number of orthogonal time-domain transmission opportunities in a Proximity Services (ProSe) traffic generation period. Resource configurations can be adjusted, including providing a new physical layer numerology, reducing transmission time interval (TTI) duration, providing a smaller sidelink control information period, configuring logical sidelink control periods and/or multiplexing of control and data transmissions.

These resource allocation methods for LTE-based ProSe communication (including vehicle to vehicle (V2V) communication) can reduce the over-air congestion and collision problems in order to control the quality and meet performance specifications of ITS (intelligent transportation system) applications and improve reliability of packet delivery. ITS applications such as active road safety and/or traffic management can use periodic and/or event-triggered transmission of the messages carrying information about vehicle and surrounding environment such as vehicle location, vehicle speed, acceleration and different types of other control messages for operation of vehicular applications.

For example, a traffic pattern generated by road safety applications is represented by periodical messages of up to $N_{V2X}$ bytes size where $N_{V2X}$ may vary in the range from 50 bytes to 1200 bytes depending on upper layers protocols and applications but typically described by $N_{V2X}=190$ bytes or $N_{V2X}=300$ bytes size. These messages are supposed to be delivered to the neighborhood entities (subscribers of V2X services (V2X users) including but not limited to vehicles, pedestrians, roadside units and/or eNBs). Reliable delivery of the messages within a predefined effective range $R_{V2X}$ (e.g., delivery to $X_{V2X}=90\%$ of V2X users within a range $R_{V2X}=300$ m) can ensure proper operation of the vehicular applications. High latency of a message delivery can cause broadcasted information to become outdated, if it is not delivered within a predefined time. In some embodiments, the latency specification ($L_{V2X}$) for V2V road safety applications is 100 ms, but may vary depending on application environment and message content (i.e., system may tolerate larger latencies, but still operate properly).

Given the periodical transmission nature of the V2X traffic, the V2V system performance may significantly depend on the amount of V2X users in the neighborhood (vehicles, pedestrians, roadside units, or other entities participating in V2X service). For example, under assumption of limited amount of allocated spectrum resources in a dense environment, system performance may degrade substantially due to frequent collisions and congestions, leading to a severe interference environment. Methods to control congestion or interference environment can be designed to help remediate this interference.

Limiting factors in a case of congested operation can be in-band emissions interference, half-duplex and co-channel interference effects.

Wireless mobile communication technology uses various standards and protocols to transmit data between a base station and a wireless mobile device or between mobile devices. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

UEs can also create their own networks. Communication between UEs can be known as Proximity Services (ProSe), which includes vehicle to device (V2X) communications such as vehicle to vehicle (V2V), vehicle to infrastructure (V21), device to device (D2D), etc. Communication between UEs can include sidelink discovery and data channels.

A 3GPP radio access technology (RAT) can be used by a UE to connect to a network. A UE is configured to identify one or more available access networks. The UE is configured to establish a connection with a RAT of the one or more available access networks. In one embodiment, an access network comprises a network for providing wireless access and implements one or more different types of RAT. Thus, the UE may connect to the access network using any of one or more available RAT types implemented by the access network.

LTE networks can have a limited support of vehicular services and may not be optimized for such services, including road safety or traffic management. A set of new methods to optimize LTE sidelink technology for V2X services can be introduced to aid in support of these services. In the LTE Release 12, basic support of Proximity Services (ProSe) is enabled, including direct communication and discovery between terminals (or UEs). The integrated frameworks in combination with LTE network infrastructure capabilities can be used to improve V2X services and in future enable the vision of "connected car" and autonomous driving concepts, while some early LTE-based V2X frameworks can be focused on road safety, traffic management and infotainment applications.

LTE Proximity Services (ProSe) introduced in LTE Release 12 includes basic functionality of sidelink discovery and data channels. Both autonomous and eNB controlled resources allocation are specified for data and discovery transmissions. An eNB controlled resources allocation, called Mode-1 for data and Type-2B for discovery, enables resource management and scheduling in presence of network coverage. An autonomous operation mode (Mode-2 for data and Type-1 for discovery) is introduced for the case of IDLE state (for discovery) or absence of network coverage (for data). These modes can have scalability and flexibility in terms of resource allocation, but lack some interference and collisions control, which can degrade D2D performance. An LTE-based V2X solution can assume at least autonomous operation with possibly limited network assistance (if available), such as a high-speed freeway scenario, where a connection with a network might not be available. Autonomous V2V operation enhancements can be introduced for sidelink resource allocation to improve performance of vehicular communication.

For example, main steps of autonomous sidelink transmissions can be as follows: (1) establish synchronization and obtain resource configuration and (for out of coverage operation the resource configuration may be pre-configured); (2) obtain resource grant by selecting resource for control and data transmission from the available set of resource. In general, the mechanism of resource selection may be random, based on medium sensing or monitoring of control channels; (3) transmit sidelink control information (SCI) inside a physical sidelink control channel (PSCCH) resource pool; and (4) transmit physical sidelink shared channel (PSSCH) inside the PSSCH resource pool.

Turning to FIG. 1, a problem of in-band emission is illustrated where a receiving UE (RX) 110 tries to receive signals from two transmitter UEs (TX1 120 and TX2 130). Assuming the same transmission power, if a channel gain between RX 110 and TX1 120 and between RX 110 and TX2 130 is substantially different, then a weaker signal using a weak in-band emission mask 140 is received under a strong in-band emission mask 150 of a stronger transmission. This leads to a reception failure of one of the signals.

A half-duplex problem is caused by UEs operating in a same frequency band. The UEs cannot transmit and receive in the same moment of time, leading to missing a part of V2V traffic from the proximal UEs and degrading the overall system performance.

A co-channel interference problem is caused by the transmission of several users on a same resource, making it problematic to receive one of the transmissions due to strong interference.

In some embodiments, there is a specified latency. For example, in some target applications for V2V traffic, a specified end-to-end latency for delivering V2V data is 100 ms. In some other applications, such as automotive driving, the specified latency can be as small as 1 ms, which is equal to a duration of an unmodified LTE subframe.

Since a limited number of orthogonal time resources can cause severe problems, such as in-band emission and half-duplex problems, current LTE sidelink operations can be modified to allow more orthogonal or semi-orthogonal time resources. Embodiments can be created to provide these resources in differing ways, including (1) a new physical layer numerology; (2) a reduced TTI duration (e.g., half of subframe or slot-based operation); (3) an enhanced resource pool configurations/structure (for control and data); and/or (4) a common design for control and data in terms of resource allocation.

V2V communication can be based on an LTE Release 12 sidelink framework, which is not optimized for such operation. Enhancements to the sidelink framework can be provided in order to deal with strict specifications on V2V packet reception performance. In particular, the enhancements provide smaller latency and higher packet reception ratio.

Figure 2:
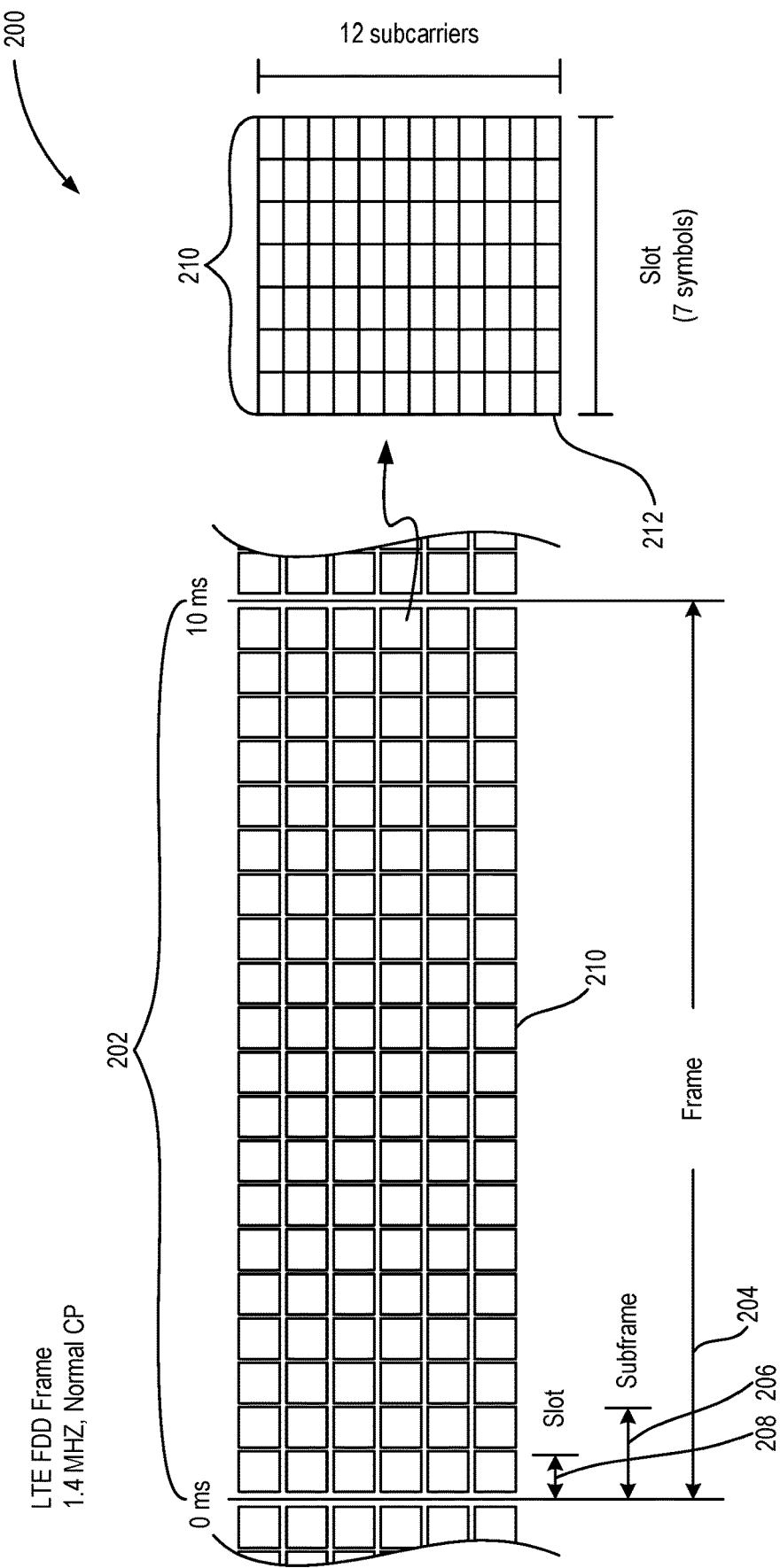
FIG. 2 is a schematic diagram illustrating a long term evolution (LTE) frame consistent with embodiments disclosed herein.

FIG. 2 is a schematic diagram 200 illustrating a long term evolution (LTE) communication frame 204 of 10 ms duration 202. In one embodiment, each frequency allocation (carrier) can be in 180 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). The frame 204 can be 10 ms with each slot 208 being 0.5 ms (and each subframe 206 being 1 ms).

The slot 208 at a carrier is a resource block 210, which includes seven symbols at 12 orthogonal frequency-division multiplexing (OFDM) subcarriers. A resource element 212 is one OFDM subcarrier for the duration of one OFDM symbol. The resource block 210 can include 84 resource elements 212 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

Figure 3:
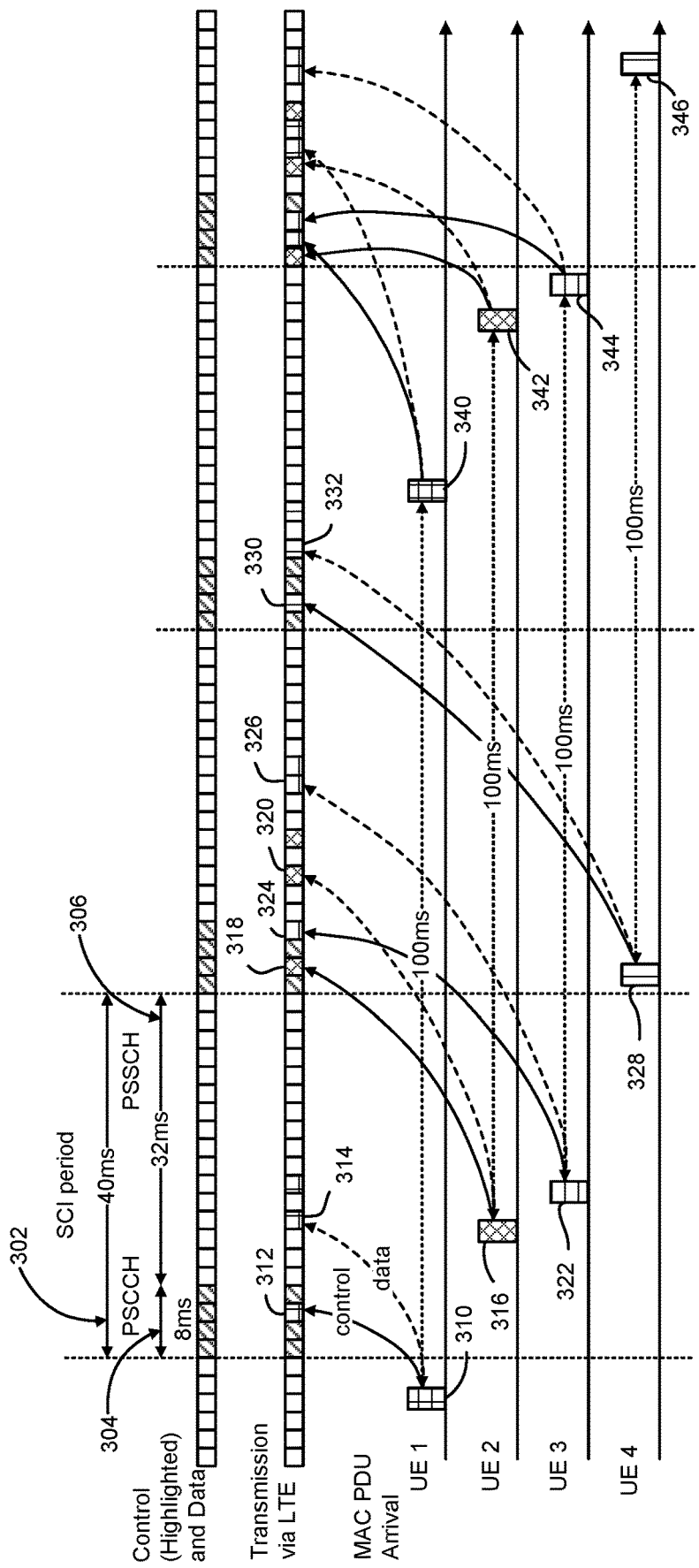
FIG. 3 is a schematic diagram illustrating a buffering effect consistent with embodiments disclosed herein.

FIG. 3 shows a typical resource pool configuration with SCI period 40 ms and 8 ms for SCI transmission. A goal of the LTE Release 12 random resource selection is to provide simple resource access in an absence of a centralized resources scheduler, like an eNB, in a case of sidelink Mode-1 operation. The random resource allocation with multiple (re)-transmissions leads to an averaging of interference (both co-channel and in-band emission) and half-duplex that ensures acceptable system performance. However, for V2V services an existing Mode-2 resource allocation procedure might not satisfy strict specifications on packet reception performance and can have drawbacks. For example, an insufficient randomization of half-duplex collision and interference on both control and data resources can occur. These problems can be caused by a lack of orthogonal time resources and limitations on control channel overhead. In another example of a drawback, a buffering effect can occur when the traffic generation period is larger than the SCI period. In this case, UEs may transmit simultaneously at the beginning of the pool. In one embodiment, for a typical V2V packet inter-arrival time of 100 ms there are 100 subframes available (each subframe is 1 ms).

As it can be seen from the example shown in FIG. 3, in the scenario, packets 310, 316, 322 and 328 arrive with 100 ms period and corresponding packets 340, 342, 344 and 346 are transmitted every 2.5 SCI period 302. Since the SCI period 302 is smaller than the traffic arrival rate, the buffering effect exists. By the buffering effect, it is meant that multiple packets 310, 316, 322 and 328 arrive during the ongoing SCI period 302 and cannot be transmitted (e.g., control (PSCCH 304) and data (PSSCH 306) transmissions 312, 314; 318, 320; 324, 326; and 330, 332) in this period and thus trigger the SCI transmission of packets 340, 342, 344 and 346 in the next SCI period, while being buffered during the ongoing SCI period.

This behavior leads to transmission of multiple data packets in the beginning of the SCI period. Since many UEs may transmit packets during the SCI period, the interference environment at the beginning and at the end of the SCI period may vary significantly due to a different interference environment given that the first subframes of each SCI period may be congested while the remaining subframes of the SCI period may be underutilized.

These problems in FIGS. 1 and 2 can be mitigated by using a new resource configuration. Limiting factors of potential performance can be interference (both co-channel and in-band emission) and half-duplex problems. A solution for reducing these problems can be to increase the number of orthogonal time-domain transmission opportunities in a V2V traffic generation period (e.g., 100 ms). Considering that some embodiments dictate that a latency of V2V traffic should be less than 100 ms, resources inside a 100 ms interval are available for modification in these embodiments. Note that each embodiment can complement each other and be used in combination with each other.

Figure 4:
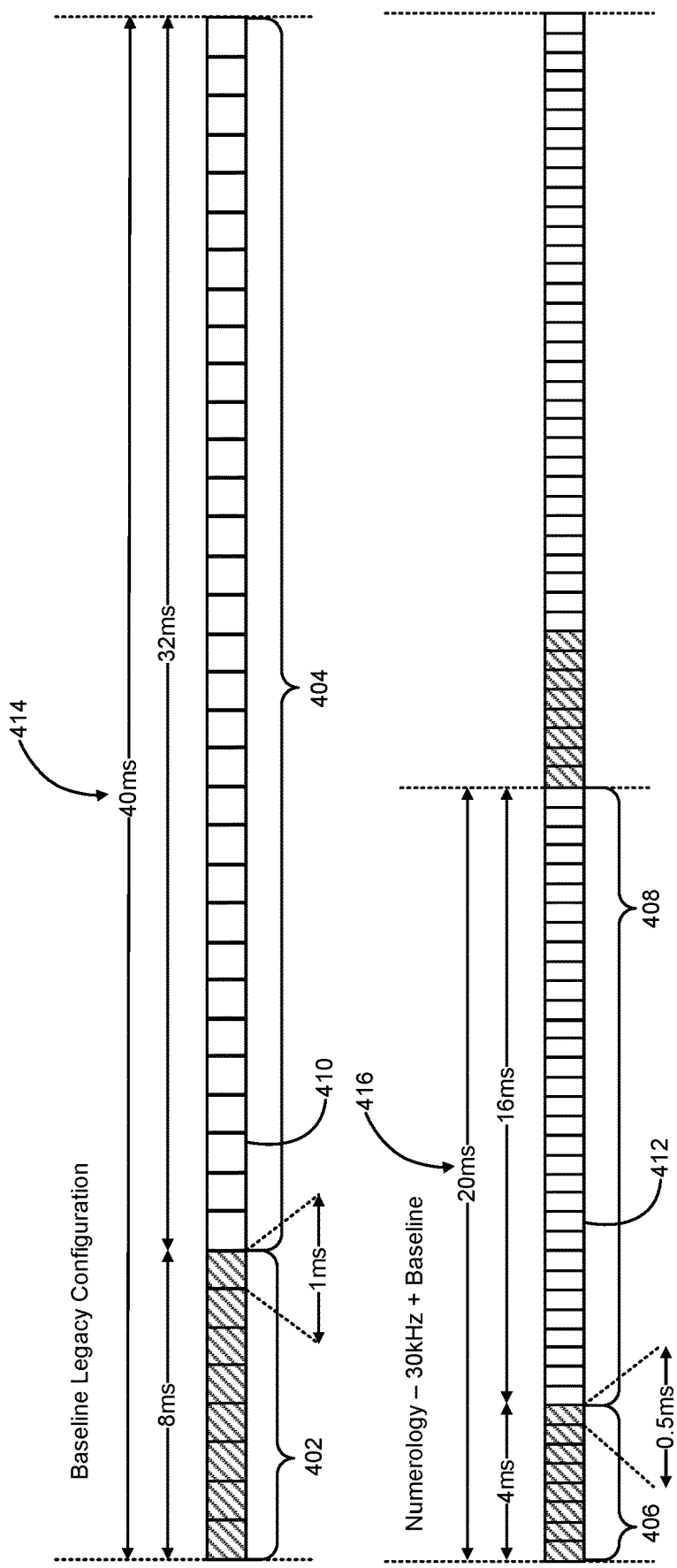
FIG. 4 is a diagram of physical resource block (PRB) adjustment of transmission time interval consistent with embodiments disclosed herein.
Figure 5:
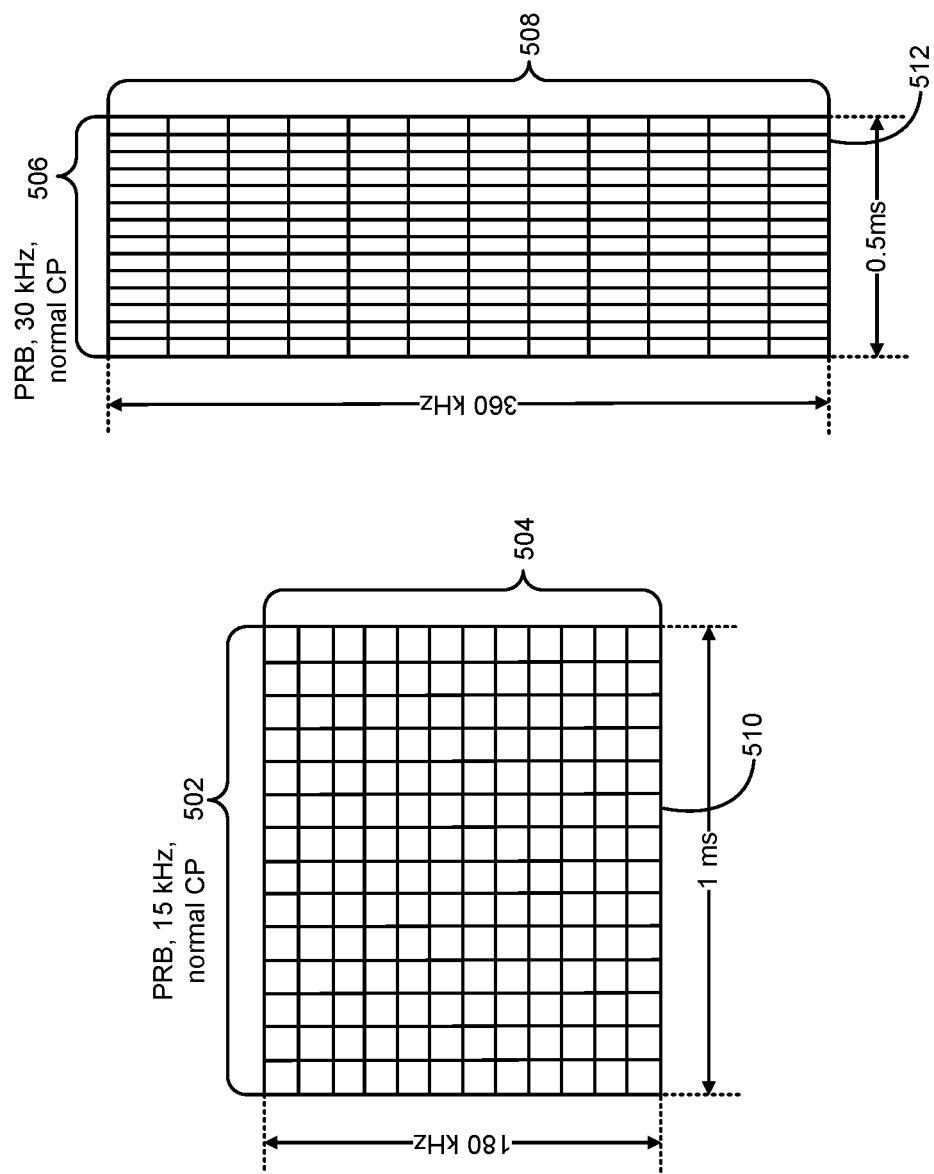
FIG. 5 is a diagram of physical resource block (PRB) adjustment of transmission time interval and subcarrier spacing consistent with embodiments disclosed herein.

FIGS. 4 and 5 show a modification to transmission time interval (TTI) and/or modification to TTI and subcarrier spacing. FIG. 4 shows a modification to transmission time interval (TTI). FIG. 5 shows an example of subcarrier spacing modified together with TTI.

FIG. 4 is a diagram of a physical resource block (PRB) 410, 412 adjustment of a TTI 414, 416. FIG. 5 is a diagram of a PRB 510, 512 adjustment of a TTI 502, 506 and a subcarrier spacing 504, 508. The physical layer numerology is changed by using a larger subcarrier spacing 508 and a shortened symbol duration 506 compared to the legacy LTE system. In some embodiments, an X times wider subcarrier spacing leads to X times shortened symbol duration. While setting another numerology, a notion of the PRB 510, 512 and subframe can be changed in terms of the number of subcarriers and symbols contained. Currently in LTE, the PRB 510, 512 contains 12 subcarriers and 14 (normal cyclic prefix) and 12 (extended cyclic prefix) symbols. However, in order to allow reusing most of the LTE physical layer specification, the number of subcarriers and symbols in the PRB 510, 512 pair may not be changed.

The shortened TTI 416, 506 provides more orthogonal time resources in a given time period. For example, extending the subcarrier spacing from 15 kHz to 30 kHz in a symmetric adjustment to the subcarrier spacing 504, 508 and TTI 502, 506 will provide a 0.5 ms subframe (TTI) duration 416, 506 instead of 1 ms that is 200 subframes per V2V packet inter-arrival period. In another case of 60 kHz subcarrier spacing, the number of subframes will be 400 due to 0.25 ms new subframe (TTI) duration 416, 506.

However, an extension of the subcarrier spacing 504, 508 also leads to the reduced number of PRBs in the same spectrum bandwidth. For 10 MHz system bandwidth, there are 50 PRBs in the legacy LTE numerology of 15 kHz subcarrier spacing, and therefore, if 30 kHz or 60 kHz are used, the 25 or 12 or 13 PRBs respectively will fit the 10 MHz bandwidth. Alternatively, the amount of PRBs 510, 512 can be preserved but the number of resource elements (REs) per PRB 510, 512 may be reduced (e.g., six for 30 KHz and/or three for 60 kHz).

For example, in an operation scenario the limiting effects can include half-duplex and in-band emission. An effect of converting frequency resources to time resources can be beneficial from a system-level performance perspective. The more time resources, the less probability of half-duplex collision and impact from in-band emission.

Figure 6:
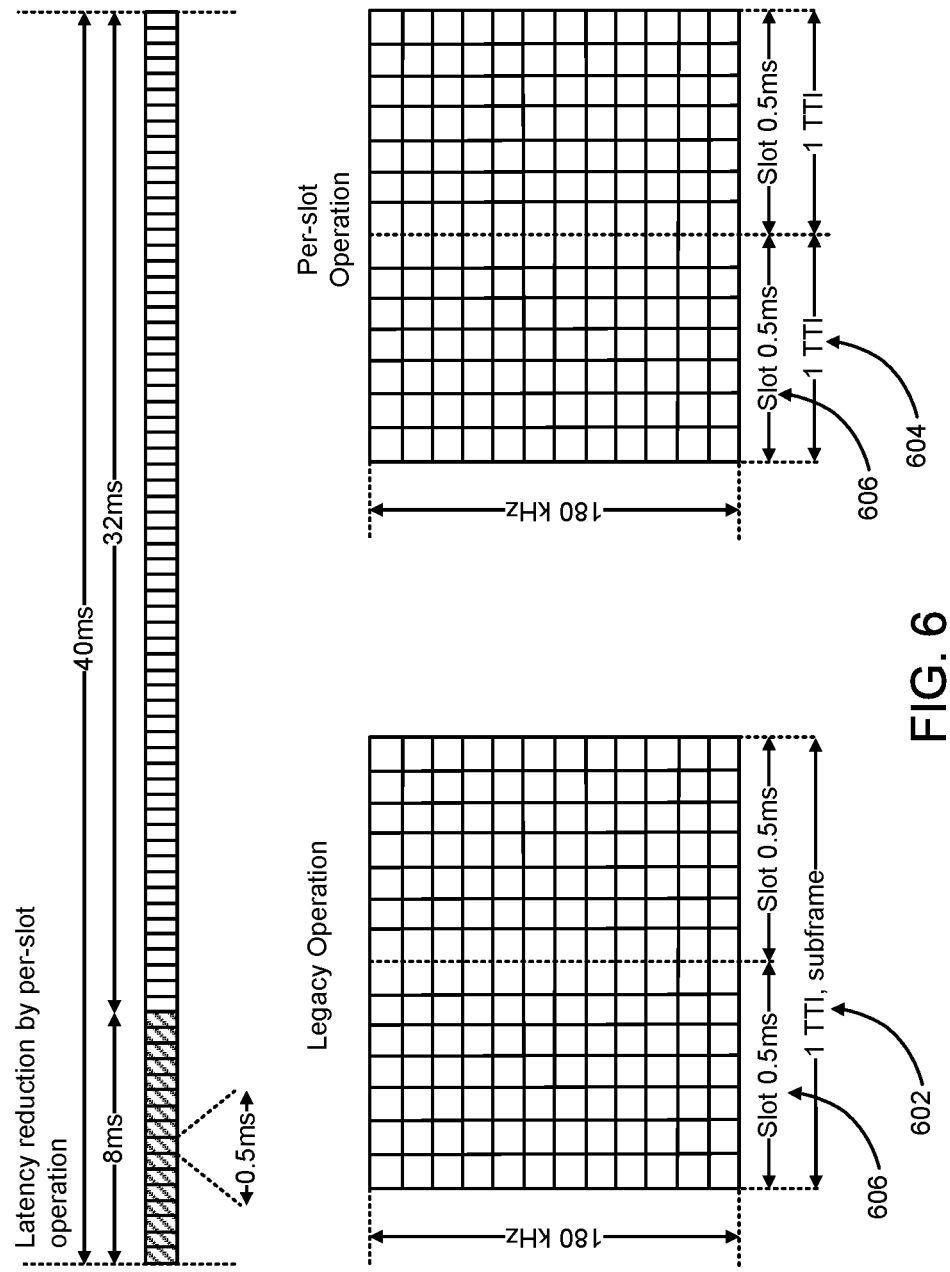
FIG. 6 is a diagram of TTI adjustment by reducing a transmission time interval consistent with embodiments disclosed herein.

FIG. 6 is a diagram of TTI adjustment by reducing a TTI 602 to 604. Another way to increase the time domain granularity of the LTE physical layer by two times is to enable per-slot 606 operation for TTI 604, i.e., operate at slot level instead of subframe level. In this case, the subcarrier spacing and the number of frequency resources do not change. In some embodiments, per-slot operation can be introduced only for PSCCH or only for PSSCH depending on what is limiting overall performance.

Figure 7:
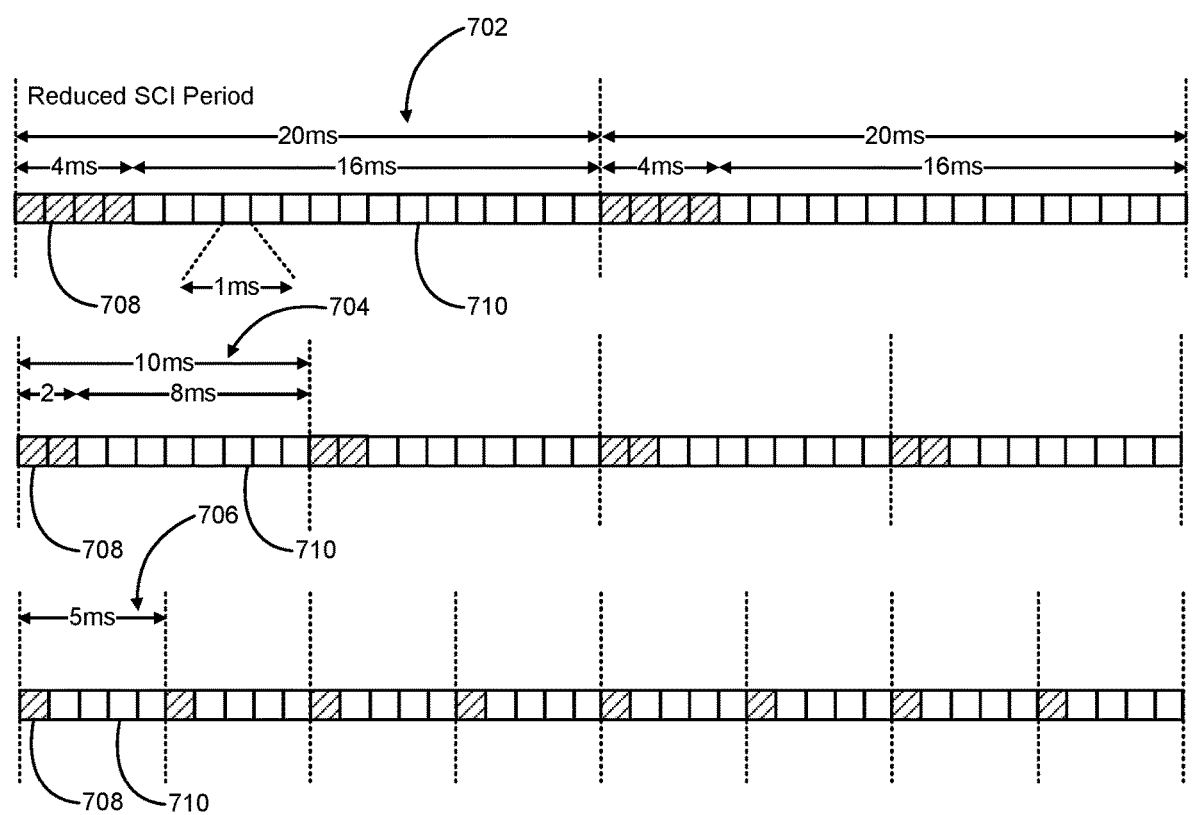
FIG. 7 is a diagram of sidelink control information (SCI) adjustment by reducing a SCI period consistent with embodiments disclosed herein.

FIG. 7 is a diagram of sidelink control information (SCI) adjustment by reducing an SCI period 702, 704, 706. The reduced latency can be achieved by introducing additional configurations to sidelink resource pools 708, 710 (control channel PSCCH 708 and shared channel PSSCH 710). In LTE Release 12, certain SCI period values are supported: [40 ms, 80 ms, 160 ms, 320 ms] subframes for FDD and TDD configurations #1-5, [70 ms, 140 ms, 280 ms] subframes for TDD configuration #0 and [60 ms, 120 ms, 240 ms] subframes for TDD configuration #6.

A usage of smaller SCI periods below 40 ms for an FDD example provides transmission of a V2V packet in each 2.5 SCI period. For example, using a configuration of an 8 ms PSCCH pool, a 32 ms PSSCH pool and a k=2 T-RPT set restriction, it can be shown that according to a current specification, each transmitting UE inside the period will transmit its data in the beginning of the 32 ms PSSCH pool, while the end of the PSSCH pool will be underutilized.

This utilization problem can be resolved by allowing shorter SCI period configurations 702, 704, 706, such as 20 ms, 10 ms, 5 ms, etc. (for the FDD case). Note that restriction on the 40 ms period granularity was mainly motivated by aligning cellular hybrid automatic repeat request (HARM) timelines with sidelink operation; however, V2V services target to be deployed in a dedicated spectrum and thus can simplify co-existence with cellular LTE operation.

Figure 8:
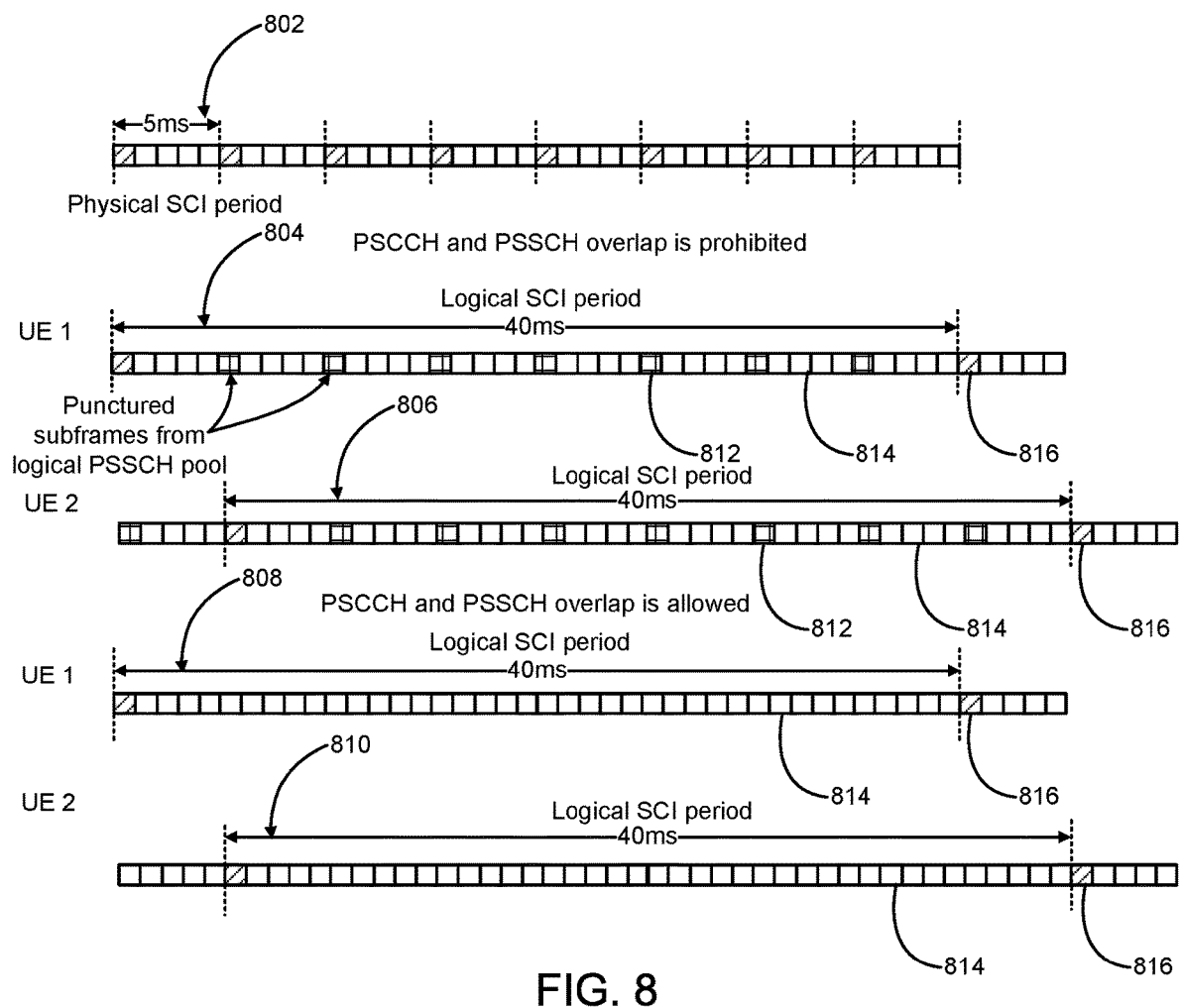
FIG. 8 is a diagram of sidelink control information (SCI) adjustment by using logical SCI periods consistent with embodiments disclosed herein.

However, the shortening of the SCI period may lead to insufficient randomization inside a small PSSCH pool if the legacy behavior of MAC protocol data unit (PDU) mapping and transmission is used. In order to avoid this issue, the logical SCI periods may be introduced on top of a physical resource allocation period. FIG. 8 shows a diagram of sidelink control information (SCI) adjustment by using logical SCI periods 804, 806, 808 and 810. A short physical SCI period 802 is used for control (PSCCH) 816 and data resource (PSSCH) 814 pool configurations while assigning a configurable logical SCI period 804, 806, 808 and 810 with UE-specific offset in multiple of physical SCI periods 802. An example of such logical cycles is shown in FIG. 8. Note that PSCCH resources 814 used by other UEs may by either used for PSSCH 814 or punctured 812 from the PSSCH transmission pool.

Another option to reduce latency is to multiplex the control and data payloads in a single transmission. There include two general approaches for enabling such a mechanism: (1) using predefined transmission parameters and/or (2) using a predefined part of the spectrum that implies subsequent data allocation. For example and in (1), control information is eliminated by using predefined transmission parameters for each allocation. In this case, the specification on flexibility of the payload size may be fulfilled by segmenting the MAC PDU onto multiple fixed payload transmissions. For example and in (2), control information is transmitted in a predefined part of the spectrum pointing to the subsequent data allocation and physical parameters accompanying data transmission. Contrary to the existing PSCCH design, the control and data are multiplexed in the same or neighbor subframes. This option may be viewed as a UE-specific logical SCI period described above with a 1 ms physical PSCCH period with allowed overlap of PSCCH and PSSCH resources.

Figure 9:
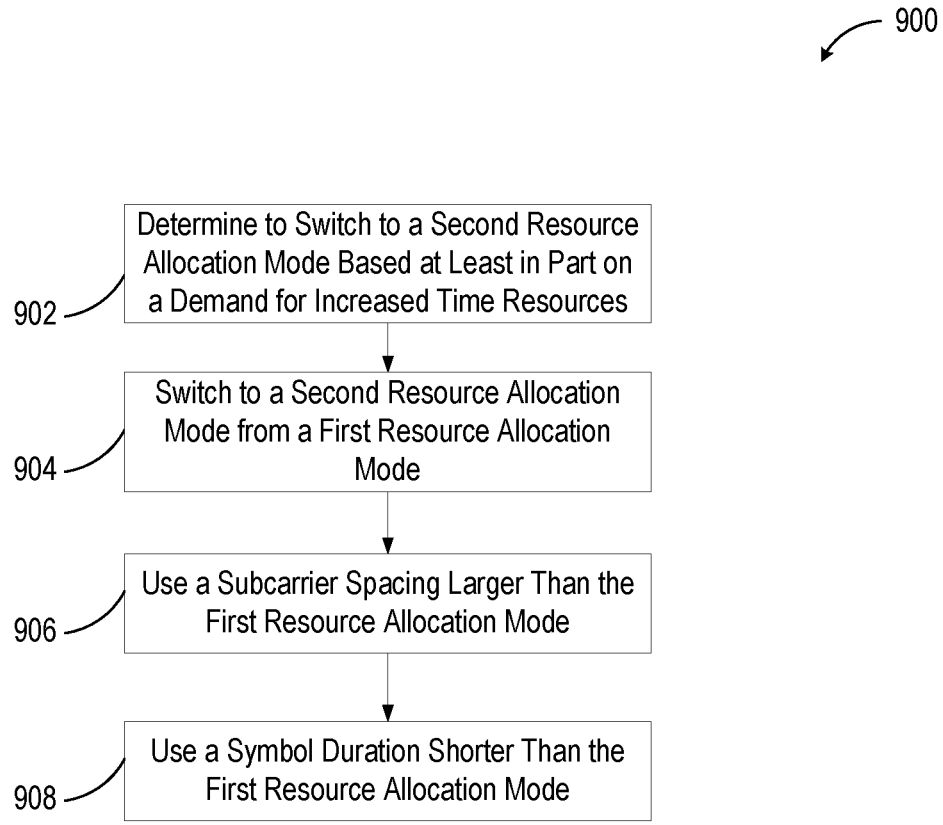
FIG. 9 is a flowchart illustrating a method for resource allocation adjustment consistent with embodiments disclosed herein.

FIG. 9 is a flowchart illustrating a method 900 for resource allocation adjustment. The method 900 can be performed by the systems described in conjunction with FIGS. 1, 10 and/or 11, including by a baseband processor. In block 902, a processor determines to switch to a second resource allocation mode based at least in part on a demand for increased time resources. In block 904, the processor switches to a second resource allocation mode from a first resource allocation mode. In block 906, the processor uses a subcarrier spacing larger than the first resource allocation mode. In block 908, the processor uses a symbol duration shorter than the first resource allocation mode.

Other methods are also possible. For method example 1, a method of sidelink resource configuration for V2V (vehicle-to-vehicle) communication can include the operations of: configuring X times shorter TTI (transmission time interval) duration for V2V spectrum resources; configuring X times larger subcarrier spacing for V2V spectrum resources; configuring short PSCCH (physical sidelink control channel) periods; configuring separate physical and logical PSCCH periods; and configuring multiplexing mode for PSCCH and PSSCH (physical sidelink shared channel). In method example 2, the method of method example 1 can be optionally modified, wherein X times shorter TTI is 0.5 ms or 0.25 ms. In method example 3, the method of method example 2 can be optionally modified, wherein X times shorter TTI is combined with X times larger subcarrier spacing. In method example 4, the method of method example 3 can be optionally modified, wherein the X times larger subcarrier spacing is 30 kHz or 60 kHz compared to 15 kHz in current LTE Releases 8-13. In method example 5, the method of method example 2 can be optionally modified, wherein the 0.5 ms TTI is achieved by considering the LTE slot as one TTI. In method example 6, the method of method example 4 can be optionally modified, wherein the number of subcarriers and symbols in a PRB (physical resource block) is not changed compared to LTE Release 8-13 physical layer numerology. In method example 7, the method of method example 4 can be optionally modified, wherein the number of subcarriers in a PRB is reduced X times compared to LTE Release 8-13 physical layer numerology. In method example 8, the method of method example 1 can be optionally modified, wherein short PSCCH period values are composed of 20 subframes, 10 subframes, 5 subframes or any other number of subframes between 1 and 40. In method example 9, the method of method example 5 can be optionally modified, wherein the reduced TTI value is applied only to either PSCCH or PSSCH. In method example 10, the method of method example 1 can be optionally modified, wherein a logical PSCCH period is different from the physical PSCCH period defined in LTE Release 12. In method example 11, the method of method example 10 can be optionally modified, wherein the logical PSCCH period is used for mapping data transmissions into a logical UE-specific PSSCH pool along the logical PSCCH period. In method example 12, the method of method example 11 can be optionally modified, wherein the PSCCH or PSSCH resources are punctured when overlapping with PSSCH or PSCCH resources respectively. In method example 13, the method of method example 11 can be optionally modified, wherein the PSCCH or PSSCH resources are not punctured when overlapping with PSSCH or PSCCH resources respectively.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
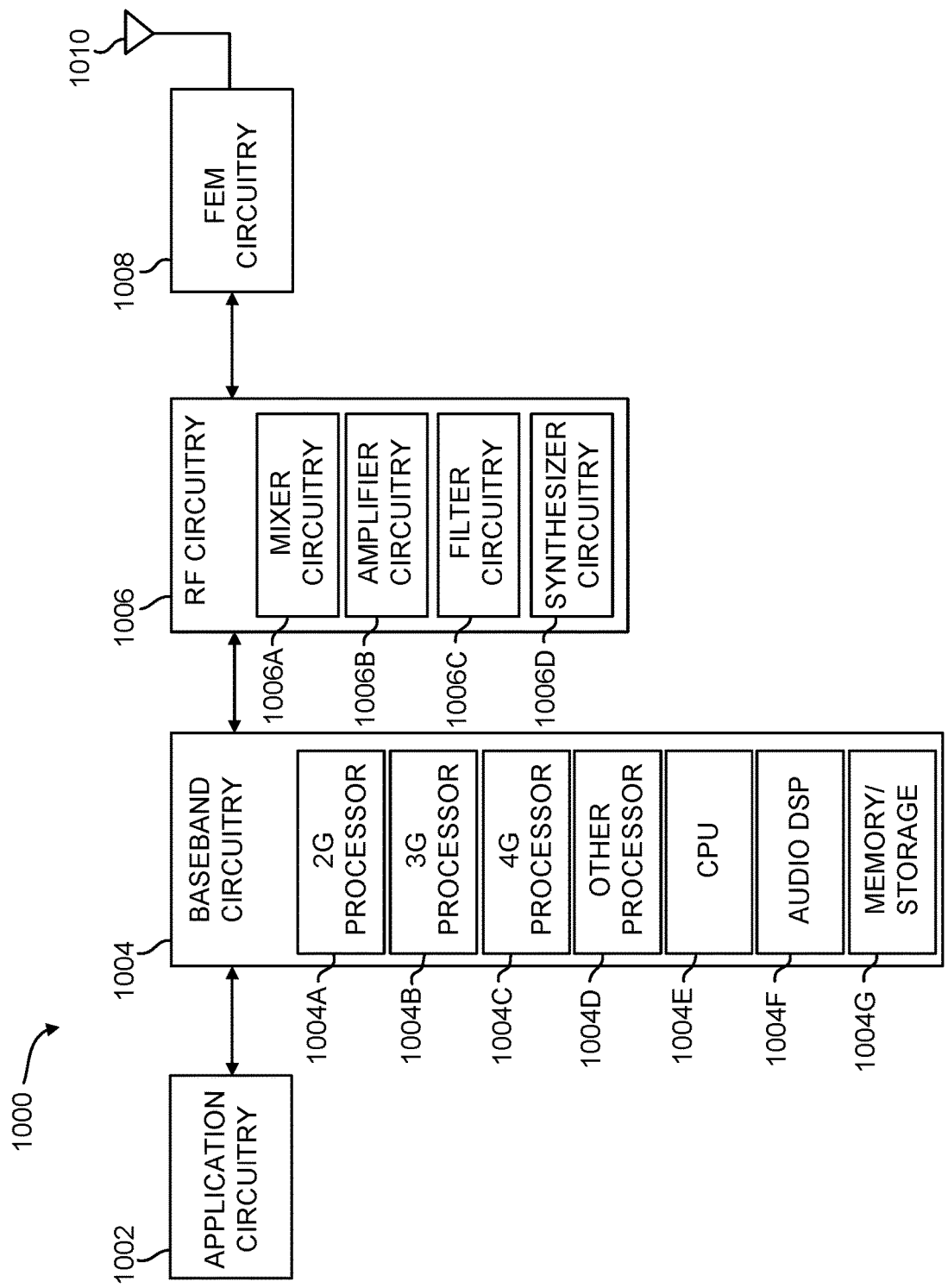
FIG. 10 is an example illustration of a user equipment (UE) device consistent with embodiments disclosed herein.

Embodiments described herein may be implemented into a system using any suitably configured hardware and/or software. FIG. 10 is a block diagram illustrating, for one embodiment, example components of a user equipment (UE) or mobile station (MS) device 1000. In some embodiments, the UE device 1000 may include application circuitry 1002, baseband circuitry 1004, Radio Frequency (RF) circuitry 1006, front-end module (FEM) circuitry 1008, and one or more antennas 1010, coupled together at least as shown in FIG. 10.

The application circuitry 1002 may include one or more application processors. By way of non-limiting example, the application circuitry 1002 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1004 may include one or more single-core or multi-core processors. The baseband circuitry 1004 may include one or more baseband processors and/or control logic. The baseband circuitry 1004 may be configured to process baseband signals received from a receive signal path of the RF circuitry 1006. The baseband circuitry 1004 may also be configured to generate baseband signals for a transmit signal path of the RF circuitry 1006. The baseband circuitry 1004 may interface with the application circuitry 1002 for generation and processing of the baseband signals, and for controlling operations of the RF circuitry 1006.

By way of non-limiting example, the baseband circuitry 1004 may include at least one of a second generation (2G) baseband processor 1004A, a third generation (3G) baseband processor 1004B, a fourth generation (4G) baseband processor 1004C, other baseband processor(s) 1004D for other existing generations, and generations in development or to be developed in the future (e.g., fifth generation (5G), 6G, etc.). The baseband circuitry 1004 (e.g., at least one of baseband processors 1004A-1004D) may handle various radio control functions that enable communication with one or more radio networks via the RF circuitry 1006. By way of non-limiting example, the radio control functions may include signal modulation/demodulation, encoding/decoding, radio frequency shifting, other functions, and combinations thereof. In some embodiments, modulation/demodulation circuitry of the baseband circuitry 1004 may be programmed to perform Fast-Fourier Transform (FFT), pre-coding, constellation mapping/demapping functions, other functions, and combinations thereof. In some embodiments, encoding/decoding circuitry of the baseband circuitry 1004 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1004 may include elements of a protocol stack. By way of non-limiting example, elements of an evolved universal terrestrial radio access network (E-UTRAN) protocol can include, for example, physical (PHY), media access control (MAC), radio link control (RLC), packet data convergence protocol (PDCP), and/or radio resource control (RRC) elements. A central processing unit (CPU) 1004E of the baseband circuitry 1004 may be programmed to run elements of the protocol stack for signaling of the PHY, MAC, RLC, PDCP and/or RRC layers. In some embodiments, the baseband circuitry 1004 may include one or more audio digital signal processor(s) (DSP) 1004F. The audio DSP(s) 1004F may include elements for compression/decompression and echo cancellation. The audio DSP(s) 1004F may also include other suitable processing elements.

The baseband circuitry 1004 may further include memory/storage 1004G. The memory/storage 1004G may include data and/or instructions for operations performed by the processors of the baseband circuitry 1004 stored thereon. In some embodiments, the memory/storage 1004G may include any combination of suitable volatile memory and/or non-volatile memory. The memory/storage 1004G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1004G may be shared among the various processors or dedicated to particular processors.

Components of the baseband circuitry 1004 may be suitably combined in a single chip, a single chipset, or disposed on a same circuit board in some embodiments. In some embodiments, some or all of the constituent components of the baseband circuitry 1004 and the application circuitry 1002 may be implemented together, such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. The RF circuitry 1006 may include a receive signal path which may include circuitry to down-convert RF signals received from the FEM circuitry 1008, and provide baseband signals to the baseband circuitry 1004. The RF circuitry 1006 may also include a transmit signal path which may include circuitry to up-convert baseband signals provided by the baseband circuitry 1004, and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006A, amplifier circuitry 1006B, and filter circuitry 1006C. The transmit signal path of the RF circuitry 1006 may include filter circuitry 1006C and mixer circuitry 1006A. The RF circuitry 1006 may further include synthesizer circuitry 1006D configured to synthesize a frequency for use by the mixer circuitry 1006A of the receive signal path and the transmit signal path. In some embodiments, the mixer circuitry 1006A of the receive signal path may be configured to down-convert RF signals received from the FEM circuitry 1008 based on the synthesized frequency provided by synthesizer circuitry 1006D. The amplifier circuitry 1006B may be configured to amplify the down-converted signals.

The filter circuitry 1006C may include a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may include zero-frequency baseband signals, although this is not a requirement. In some embodiments, the mixer circuitry 1006A of the receive signal path may comprise passive mixers, although the scope of the embodiments is not limited in this respect.

In some embodiments, the mixer circuitry 1006A of the transmit signal path may be configured to up-convert input baseband signals based on the synthesized frequency provided by the synthesizer circuitry 1006D to generate RF output signals for the FEM circuitry 1008. The baseband signals may be provided by the baseband circuitry 1004 and may be filtered by the filter circuitry 1006C. The filter circuitry 1006C may include a low-pass filter (LPF), although the scope of the embodiments is not limited in this respect. In some embodiments, the mixer circuitry 1006A of the receive signal path and the mixer circuitry 1006A of the transmit signal path may include two or more mixers, and may be arranged for quadrature downconversion and/or upconversion, respectively. In some embodiments, the mixer circuitry 1006A of the receive signal path and the mixer circuitry 1006A of the transmit signal path may include two or more mixers and may be arranged for image rejection (e.g., Hartley image rejection). In some embodiments, the mixer circuitry 1006A of the receive signal path and the mixer circuitry 1006A of the transmit signal path may be arranged for direct downconversion and/or direct upconversion, respectively. In some embodiments, the mixer circuitry 1006A of the receive signal path and the mixer circuitry 1006A of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 1006 may include analog-to-digital converter (ADC) and digital-to-analog converter (DAC) circuitry, and the baseband circuitry 1004 may include a digital baseband interface to communicate with the RF circuitry 1006.

In some dual-mode embodiments, separate radio IC circuitry may be provided for processing signals for each spectrum, although the scope of the embodiments is not limited in this respect.

In some embodiments, the synthesizer circuitry 1006D may include one or more of a fractional-N synthesizer and a fractional N/N+1 synthesizer, although the scope of the embodiments is not limited in this respect as other types of frequency synthesizers may be suitable. For example, synthesizer circuitry 1006D may include a delta-sigma synthesizer, a frequency multiplier, a synthesizer comprising a phase-locked loop with a frequency divider, other synthesizers and combinations thereof.

The synthesizer circuitry 1006D may be configured to synthesize an output frequency for use by the mixer circuitry 1006A of the RF circuitry 1006 based on a frequency input and a divider control input. In some embodiments, the synthesizer circuitry 1006D may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

The synthesizer circuitry 1006D of the RF circuitry 1006 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1006D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

The FEM circuitry 1008 may include a receive signal path which may include circuitry configured to operate on RF signals received from one or more antennas 1010, amplify the received signals, and provide the amplified versions of the received signals to the RF circuitry 1006 for further processing. The FEM circuitry 1008 may also include a transmit signal path which may include circuitry configured to amplify signals for transmission provided by the RF circuitry 1006 for transmission by at least one of the one or more antennas 1010.

In some embodiments, the FEM circuitry 1008 may include a TX/RX switch configured to switch between a transmit mode and a receive mode operation. The FEM circuitry 1008 may include a receive signal path and a transmit signal path. The receive signal path of the FEM circuitry 1008 may include a low-noise amplifier (LNA) to amplify received RF signals and provide the amplified received RF signals as an output (e.g., to the RF circuitry 1006). The transmit signal path of the FEM circuitry 1008 may include a power amplifier (PA) configured to amplify input RF signals (e.g., provided by RF circuitry 1006), and one or more filters configured to generate RF signals for subsequent transmission (e.g., by one or more of the one or more antennas 1010).

In some embodiments, the MS device 1000 may include additional elements such as, for example, memory/storage, a display, a camera, one of more sensors, an input/output (I/O) interface, other elements, and combinations thereof.

In some embodiments, the MS device 1000 may be configured to perform one or more processes, techniques, and/or methods as described herein, or portions thereof.

Figure 11:
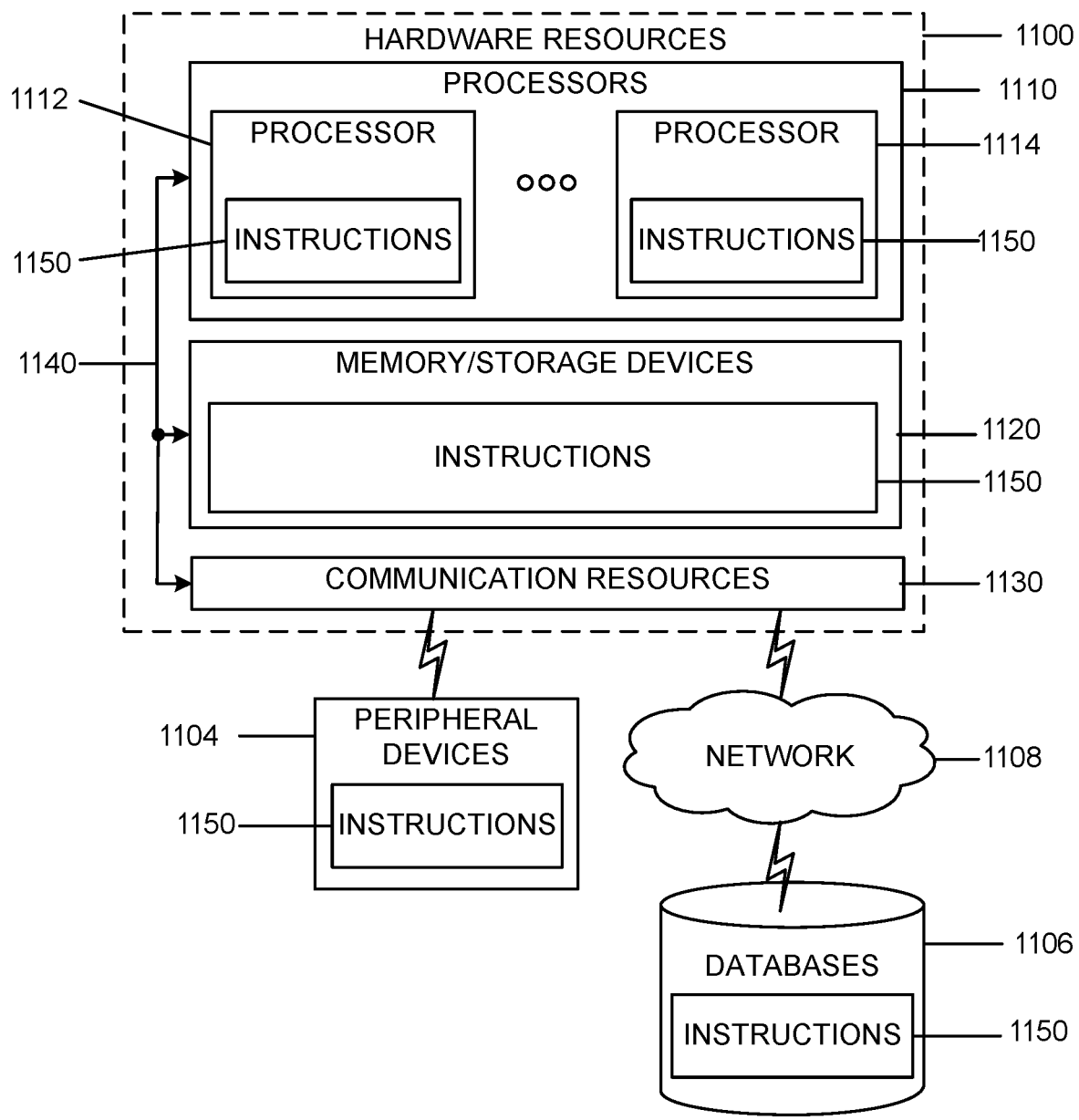
FIG. 11 is a schematic diagram of a computing system consistent with embodiments disclosed herein.

FIG. 11 is a block diagram illustrating components, according to some example embodiments, able to read instructions from a machine-readable or computer-readable medium (e.g., a machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which are communicatively coupled via a bus 1140.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114. The memory/storage devices 1120 may include main memory, disk storage, or any suitable combination thereof.

The communication resources 1130 may include interconnection and/or network interface components or other suitable devices to communicate with one or more peripheral devices 1104 and/or one or more databases 1106 via a network 1108. For example, the communication resources 1130 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 and/or the databases 1106. Accordingly, the memory of processors 1110, the memory/storage devices 1120, the peripheral devices 1104, and the databases 1106 are examples of computer-readable and machine-readable media.

EXAMPLES

Example 1 is a system for sidelink resource configuration. The system includes an enhanced node B (eNB) wireless interface, a sidelink wireless interface, and a processor. The enhanced node B (eNB) wireless interface includes a first resource allocation mode with a transmission time interval (TTI) and a resource block design. The sidelink wireless interface includes a second resource allocation mode. The second TTI is less than the first TTI, and fewer symbols of a resource block are used in the second TTI than the first resource allocation mode. The processor is attached to the eNB wireless interface and sidelink wireless interface, and is designed to switch to the second resource allocation mode from the first resource allocation mode, and transmit a message to a sidelink capable device using the second resource allocation mode and the second TTI.

In Example 2, the subject matter of Example 1 or any of the Examples described herein may further include a sidelink control information (SCI) period where the second resource allocation mode is less than 40 milliseconds, allowing a reduced latency compared with the first resource allocation mode which has a control information period of 40 milliseconds or greater.

In Example 3, the subject matter of Example 2 or any of the Examples described herein may further include the SCI period which may be 5 milliseconds, 10 milliseconds, or 20 milliseconds.

In Example 4, the subject matter of Example 1 or any of the Examples described herein may further include a subcarrier spacing of the second resource allocation mode which is larger than the first resource allocation mode.

In Example 5, the subject matter of Example 4 or any of the Examples described herein may further include a symbol duration of the second resource allocation mode which is shorter than the first resource allocation mode.

In Example 6, the subject matter of Example 1 or any of the Examples described herein may further include an autonomous resource allocation mode in the second resource allocation mode.

In Example 7, the subject matter of Example 1 or any of the Examples described herein may further include an eNB-controlled resource allocation mode in the second resource allocation mode.

In Example 8, the subject matter of Example 1 or any of the Examples described herein may further include a first TTI which is a per subframe interval, and a second TTI which is a per-slot interval.

In Example 9, the subject matter of Example 1 or any of the Examples described herein may further include the second resource allocation mode which uses the second TTI to reduce buffering to achieve a 100 milliseconds latency.

Example 10 is an apparatus for a user equipment (UE) for long term evolution (LTE) Proximity Services (ProSe) resource configuration. The apparatus includes storage and a baseband processor. The storage is designed to hold control information for a first resource allocation mode and a sidelink control information for a second resource allocation mode. The baseband processor is designed to switch to the second resource allocation mode from the first resource allocation mode where the sidelink control information (SCI) period of the second resource allocation mode is less than 40 milliseconds, thereby allowing a reduced latency compared with the first resource allocation mode having a control information period of 40 milliseconds or greater.

In Example 11, the subject matter of Example 10 or any of the Examples described herein may further include the SCI period which may be 5 milliseconds, 10 milliseconds, or 20 milliseconds.

In Example 12, the subject matter of Example 10 or any of the Examples described herein may further include the baseband processor designed to use a logical SCI period with UE-specific offsets causing multiple physical SCI periods.

In Example 13, the subject matter of Example 12 or any of the Examples described herein may further include the physical sidelink control channel (PSCCH) resource of the first UE which may be punctured from a data transmission of a second UE.

In Example 14, the subject matter of Example 12 or any of the Examples described herein may further include the SCI period which may be a physical sidelink control channel (PSCCH) period.

In Example 15, the subject matter of Example 14 or any of the Examples described herein may further include a logical PSCCH period which may be different from a physical PSCCH period.

In Example 16, the subject matter of Example 14 or any of the Examples described herein may further include the PSCCH resources which are punctured when overlapping with physical sidelink shared channel (PSSCH) resources.

In Example 17, the subject matter of Example 14 or any of the Examples described herein may further include the physical sidelink shared channel (PSSCH) resources which are punctured when overlapping with PSCCH resources.

In Example 18, the subject matter of Example 10 or any of the Examples described herein may further include the second resource allocation mode in an autonomous resource allocation mode.

In Example 19, the subject matter of Example 10 or any of the Examples described herein may further include the second resource allocation mode in an enhanced node B (eNB) controlled resource allocation mode.

In Example 20, the subject matter of Example 10 or any of the Examples described herein may further include a second transmission time interval (TTI) of the second resource allocation mode which is less than a TTI of the first resource allocation mode.

In Example 21, the subject matter of Example 20 or any of the Examples described herein may further include fewer symbols of a resource block used in the TTI of the second resource allocation mode than the first resource allocation mode.

Example 22 is an apparatus for long term evolution (LTE) Proximity Services (ProSe) resource configuration. The apparatus also includes a method for switching to a second resource allocation mode based on a demand for increased time resources; a method for switching to a second resource allocation mode from a first resource allocation mode; a method for using a subcarrier spacing larger than the first resource allocation mode; and a method for using a symbol duration shorter than the first resource allocation mode.

In Example 23, the subject matter of Example 22 or any of the Examples described herein may further include the method for using the shorter symbol duration which results in a shorter subframe duration and a shorter transmission time interval (TTI).

Example 24 is a computer program product. The computer program product includes a computer-readable storage medium which stores program code for causing one or more processors to perform a method. This method includes switching to a second resource allocation mode based at least in part on a demand for increased time resources; switching to a second resource allocation mode from a first resource allocation mode; using a subcarrier spacing larger than the first resource allocation mode; and using a symbol duration shorter than the first resource allocation mode.

In Example 25, the subject matter of Example 24 or any of the Examples described herein may further include a shorter symbol duration which results in a shorter subframe duration and a shorter transmission time interval (TTI).

In Example 26, the subject matter of Example 25 or any of the Examples described herein may further include using the subframe duration shorter than the first resource allocation mode, which includes shortening the TTI from 1 millisecond to 0.5 milliseconds and increasing the subcarrier spacing from 15 kHz to 30 kHz.

In Example 27, the subject matter of Example 25 or any of the Examples described herein may further include using the subframe duration shorter than the first resource allocation mode, which includes shortening the TTI from 1 milliseconds to 0.25 milliseconds and increasing the subcarrier spacing from 15 kHz to 60 kHz.

In Example 28, the subject matter of Example 24 or any of the Examples described herein may further include the first resource allocation mode in an enhanced node B (eNB) controlled resource allocation mode.

In Example 29, the subject matter of Example 24 or any of the Examples described herein may further include a multiplier, used to increase the subcarrier spacing, and is used as a divisor to decrease the symbol duration.

In Example 30, the subject matter of Example 24 or any of the Examples described herein may further include the second resource allocation mode and the first resource allocation mode having the same number of symbols.

In Example 31, the subject matter of Example 24 or any of the Examples described herein may further include the second resource allocation mode in an autonomous resource allocation mode.

In Example 32, the subject matter of Example 24 or any of the Examples described herein may further include the second resource allocation mode in an enhanced node B (eNB)-controlled resource allocation mode.

In Example 33, the subject matter of Example 24 or any of the Examples described herein may further include the method containing a sidelink control information (SCI) period of the second resource allocation mode which is less than 40 milliseconds, thus allowing a reduced latency compared with the first resource allocation mode having a control information period of 40 milliseconds or greater.

In Example 34, the subject matter of Example 33 or any of the Examples described herein may further include the SCI period which may be is 5 milliseconds, 10 milliseconds, or 20 milliseconds.

In Example 35, the subject matter of Example 24 or any of the Examples described herein may further include a second transmission time interval of the second resource allocation mode which is less than a transmission time interval of the first resource allocation mode.

In Example 36, the subject matter of Example 35 or any of the Examples described herein may further include fewer symbols of a resource block which are used in the transmission time interval of the second resource allocation mode than the first resource allocation mode.

Example 37 is a method for long term evolution (LTE) second operation mode sidelink resource configuration. The method includes switching to a second resource allocation mode based at least in part on a demand for increased time resources; switching to a second resource allocation mode from a first resource allocation mode; using a subcarrier spacing larger than the first resource allocation mode; and using a symbol duration shorter than the first resource allocation mode.

In Example 38, the subject matter of Example 37 or any of the Examples described herein may further include a shorter symbol duration which results in a shorter subframe duration and a shorter transmission time interval (TTI).

In Example 39, the subject matter of Example 38 or any of the Examples described herein may further include using the subframe duration shorter than the first resource allocation mode, and further includes shortening the TTI from 1 millisecond to 0.5 milliseconds and increasing the subcarrier spacing from 15 kHz to 30 kHz.

In Example 40, the subject matter of Example 38 or any of the Examples described herein may further include using the subframe duration shorter than the first resource allocation mode, and further includes shortening the TTI from 1 millisecond to 0.25 milliseconds and increasing the subcarrier spacing from 15 kHz to 60 kHz.

In Example 41, the subject matter of Example 37 or any of the Examples described herein may further include the first resource allocation mode in an enhanced node B (eNB)-controlled resource allocation mode.

In Example 42, the subject matter of Example 37 or any of the Examples described herein may further include the second resource allocation mode in an autonomous resource allocation mode.

In Example 43, the subject matter of Example 37 or any of the Examples described herein may further include a multiplier, used to increase the subcarrier spacing, and is also used as a divisor to decrease the symbol duration.

In Example 44, the subject matter of Example 37 or any of the Examples described herein may further include the second resource allocation mode and the first resource allocation mode having a same number of symbols.

In Example 45, the subject matter of Example 37 or any of the Examples described herein may further include using a sidelink control information (SCI) period of the second resource allocation mode that is less than 40 milliseconds, allowing a reduced latency compared with the first resource allocation mode having a control information period of 40 milliseconds or greater.

In Example 46, the subject matter of Example 45 or any of the Examples described herein may further include the SCI period which may be 5 milliseconds, 10 milliseconds, or 20 milliseconds.

In Example 47, the subject matter of Example 37 or any of the Examples described herein may further include a second transmission time interval (TTI) of the second resource allocation mode which is less than a TTI of the first resource allocation mode.

In Example 48, the subject matter of Example 47 or any of the Examples described herein may further include fewer symbols of a resource block used in the TTI of the second resource allocation mode than the first resource allocation mode.

Example 49 is a method for long term evolution (LTE) second operation mode sidelink resource configuration. The method includes switching to a second resource allocation mode based at least in part on a demand for increased time resources; switching to a second resource allocation mode from a first resource allocation mode; and selecting predefined transmission parameters for each transmission allocation, thus allowing a multiplexing of a control payload and a data payload.

In Example 50, the subject matter of Example 49 or any of the Examples described herein may further include segmenting a media access control protocol data unit (MAC PDU) into multiple fixed payload transmissions.

Example 51 is a method for a long term evolution (LTE) second operation mode sidelink resource configuration. The method includes switching to a second resource allocation mode based at least in part on a demand for increased time resources; switching to a second resource allocation mode from a first resource allocation mode; and using a predefined part of the spectrum to transmit control information which implicitly indicates a subsequent data allocation and physical parameters of an associated data transmission.

In Example 52, the subject matter of Example 51 or any of the Examples described herein may further include control and data which are multiplexed in a same or neighbor subframe.

In Example 53, the subject matter of Example 51 or any of the Examples described herein may further include using a predefined part, which further includes enabling an overlap of physical sidelink control channel (PSCCH) resources and physical sidelink shared channel (PSSCH) resources.

Example 54 is an apparatus which includes a procedure to perform a method as claimed in any of Example 37-53.

Example 55 is a machine-readable storage which includes machine-readable instructions, which when executed, implement a method or realize an apparatus as provides in any of Examples 37-53.

Example 56 is a machine-readable medium which includes code, which when executed, causes a machine to perform the method of any one of Example 37-53.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc. that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" or "for example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the description, numerous specific details are provided, such as examples of materials, frequencies, sizes, lengths, widths, shapes, etc. to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of the embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles. The scope of the present disclosure should, therefore, be determined only by the following claims.

The invention claimed is:

1. A system for sidelink resource configuration comprising:
   an enhanced node B (eNB) wireless interface, the interface configured with a first resource allocation mode having a first transmission time interval (TTI) and a resource block configuration;
   a sidelink wireless interface, the interface configured with a second resource allocation mode, wherein a second TTI of the second resource allocation mode is less than a TTI of the first resource allocation mode, wherein the second resource allocation mode uses the second TTI to reduce buffering to achieve a 100 milliseconds latency, and wherein fewer symbols of a resource block are used in the TTI of the second resource allocation mode than the first resource allocation mode;
   a processor coupled to the eNB wireless interface and sidelink wireless interface, the processor configured to:
      switch to the second resource allocation mode from the first resource allocation mode; and
      transmit a message to a sidelink capable device using the second resource allocation mode and the second TTI.

2. The system of claim 1, wherein a sidelink control information (SCI) period of the second resource allocation mode is less than 40 milliseconds, allowing a reduced latency compared with the first resource allocation mode having a control information period of 40 milliseconds or greater.

3. The system of claim 2, wherein the SCI period is 5 milliseconds, 10 milliseconds, or 20 milliseconds.

4. The system of claim 1, wherein a subcarrier spacing of the second resource allocation mode is larger than the first resource allocation mode.

5. The system of claim 4, wherein a symbol duration of the second resource allocation mode is shorter than the first resource allocation mode.

6. The system of claim 1, wherein the second resource allocation mode is an autonomous resource allocation mode.

7. The system of claim 1, wherein the second resource allocation mode is an eNB-controlled resource allocation mode.

8. The system of claim 1, wherein the first TTI is a per subframe interval and the second TTI is a per-slot interval.

* * * * *